United States Patent [19]

Chiba et al.

[11] Patent Number: 4,806,519

[45] Date of Patent: Feb. 21, 1989

[54] CATALYST FOR PURIFYING MOTOR VEHICLE EXHAUST GASES AND PROCESS FOR PRODUCING THE CATALYST

[75] Inventors: Tadao Chiba, Chiba; Masaki Funabiki; Tsunao Watanabe, both of Shizuoka, all of Japan

[73] Assignee: Engelhard Corporation, Menlo Park, N.J.

[21] Appl. No.: 102,505

[22] Filed: Sep. 29, 1987

[30] Foreign Application Priority Data

Sep. 30, 1986 [JP] Japan .................................. 61-230026

[51] Int. Cl.$^4$ ........................ B01J 21/06; B01J 23/10; B01J 23/42; B01J 23/46
[52] U.S. Cl. .................................... 502/252; 502/304; 423/213.5
[58] Field of Search ............................... 502/252, 304; 423/213.5

[56] References Cited

U.S. PATENT DOCUMENTS

| 4,378,307 | 9/1980 | Brunelle et al. . | |
| 4,581,343 | 4/1986 | Blanchard et al. | 502/304 X |
| 4,587,231 | 5/1986 | Sawamura et al. | 502/304 |
| 4,680,282 | 7/1987 | Blanchard et al. . | |

FOREIGN PATENT DOCUMENTS

| 0027069 | 9/1980 | European Pat. Off. . | |
| 0125565 | 5/1984 | European Pat. Off. . | |
| 0142858 | 11/1984 | European Pat. Off. . | |
| 170588 | 2/1986 | European Pat. Off. | 502/304 |
| 2450664 | 10/1974 | Fed. Rep. of Germany . | |
| 1492929 | 10/1973 | United Kingdom . | |

OTHER PUBLICATIONS

Patent Abstracts of Japan, vol. 8, No. 246 (C-251)[1683], Nov. 10, 1984; & JP-A-59 127 649 (Toyota Jidosha K.K.) 23-07-1984.

*Primary Examiner*—W. J. Shine

[57] ABSTRACT

A catalyst, and a method for producing the catalyst, and a method for purifying exhaust gases which is very efficient in its use of rhodium has a layered catalytic structure on a refractory substrate, the inner layer containing ceria and platinum, the outer layer containing zirconia and rhodium.

23 Claims, 1 Drawing Sheet

CATALYST FOR PURIFYING MOTOR VEHICLE EXHAUST GASES AND PROCESS FOR PRODUCING THE CATALYST

DETAILED DESCRIPTION OF THE INVENTION

This invention relates to a catalyst for purifying exhaust gases from internal combustion engines of automobiles, etc., and to a process for production thereof More specifically, this invention relates to a catalyst for purifying exhaust gases, essentially comprising a substantially catalytically inert, refractory monolithic support, an inside layer containing a catalytically active refractory oxide on the support, and an outside layer containing a catalytically active refractory oxide on the inside layer, and to a process for production thereof.

[Prior Art]

A catalyst comprising a support and two or more layers of refractory oxide thereon is known.

For example, Japanese Laid-Open Patent Publication No. 145381/1975 discloses a catalyst-supported structure for purifying exhaust gases comprising a thermally insulating ceramic carrier and at least two layers of catalyst-containing alumina or -zirconia, the catalysts in the catalyst-containing alumina or -zirconia layers being different from each other.

Japanese Laid-Open Patent Publication No. 105240/1982 discloses a catalyst for purifying exhaust gases containing at least two kinds of platinum-group metals, said catalyst comprising at least two carrier layers of a refractory metal oxide containing one kind of the platinum-group metals of different kinds and as required, a layer of a refractory metal oxide free from the platinum-group metal between the carrier layers and/or on the outside of these carrier layers.

Japanese Laid-Open Patent Publication No. 52530/1984 discloses a catalyst having a first porous carrier layer composed of an inorganic substrate and a heat-resistant noble metal-type catalyst deposited on the surface of the substrate and a second heat-resistant non-porous granular carrier layer having deposited thereon a noble metal-type catalyst, said second carrier layer being formed on the surface of the first carrier layer and having resistance to the catalyst poison.

Japanese Laid-Open Patent Publication No. 127649/1984 discloses a catalyst for purifying exhaust gases, comprising an inorganic carrier substrate such as cordierite, an alumina layer formed on the surface of the substrate and having deposited thereon at least one rare earth metal such as lanthanum and cerium and at least one of platinum and palladium, and another alumina layer formed on the aforesaid alumina layer and having deposited thereon a base metal such as iron or nickel, at least one rare earth metal such as lanthanum, and rhodium.

Japanese Laid-Open Patent Publication No. 19036/1985 discloses a catalyst for purifying exhaust gases having an enhanced ability to remove carbon monoxide at low temperatures, said catalyst comprising a substrate composed, for example, of coerdierite and two layers of active alumina laminated to the surface of the substrate, the lower alumina layer containing platinum or vanadium deposited thereon, and the upper alumina layer containing rhodium and platinum, or rhodium and palladium, deposited thereon.

Japanese Laid-Open Patent Publication No. 31828/1985 discloses a catalyst for purifying exhaust gases, comprising a honeycomb carrier and a noble metal having a catalytic action for purifying exhaust gases, the carrier being covered with an inside and an outside alumina layer, the inside layer having more noble metal adsorbed thereon than the outside layer; and a process for production of this catalyst.

Japanese Laid-Open Patent Publication No. 232253/1985 discloses a monolithic catalyst for purifying exhaust gases being in the shape of a pillar and comprising a number of cells disposed from an exhaust gas inlet side toward an exhaust gas outlet side, an alumina layer being formed on the inner wall surface of each of the cells, and catalyst ingredients being deposited on the alumina layer, the alumina layer consisting of a first alumina layer on the inside and a second alumina layer on the surface side, the first alumina layer having palladium and neodymium deposited thereon, and the second alumina layer having platinum and rhodium deposited thereon.

None of the above-cited patent documents disclose a two-layer catalyst comprising an inside layer containng a catalytically active refractory oxide, the inside layer containing cerium oxide and platinum as essential ingredients and havng a weight of 10 to 200 g per liter of the catalyst, and an outside layer containing a catalytically active refractory oxide, the outside layer containing a zirconium compound and rhodium as essential ingredients and having a weight of 5 to 60 g per liter of the catalyst

[Problem Sought to be Solved by the Invention]

It is known that rhodium exhibits an important catalytic action in the purification of exhaust gases containing carbon monoxide, hydrocarbons and nitrogen oxides. Many exhaust gas purifying catalysts comprising rhodium are known.

Rhodium is one of those platinum-group catalysts whose resources are particularly greatly limited. Furthermore, since the price of rhodium is high, it is desirable to minimize the amount of rhodium used in producing exhaust gas purifying catalysts while making use of the characteristics of rhodium as a catalyst. From this standpoint, none of the previously known rhodium-containing catalysts for purifying exhaust gases prove to be satisfactory.

It is an object of this invention to provide a catalyst which exhibits the catalytic characteristics of rhodium as much as possible and minimizes the amount of rhodium.

It is another object of this invention to provide a process for producing the aforesaid rhodium-containing catalyst.

[Means for Solving the Problem]

The above object is achieved by a catalyst for purifying exhaust gases essentially comprising a substantially catalytically inert, refractory monolithic support, an inside layer containing a catalytically active refractory oxide on the support, and an outside layer containing a catalytically active refractory oxide on the inside layer, characterized in that the support has continuous longitudinal unobstructed flow channels each extending through the support and defined by a thin wall, the inside layer is deposited on the walls of the channels, contains cerium oxide and platinum and has a weight of 10 to 200 g per liter of the catalyst, the outside layer is deposited on the inside layer, contains a zirconium compound and rhodium and has a weight of 5 to 60 g per liter of the catalyst, and the catalytically active refractory oxide is finely divided and has a specific surface area of at least about 10 $m^2/g$.

The other object of this invention is achieved by a process for producing a catalyst for purifying exhaust gases essentially comprising a substantially catalytically inert, refractory monolithic support, an inside layer containing a catalytically active refractory oxide on the support, and an outside layer containing a catalytically active refractory oxide on the inside layer, wherein the support has a continuous longitudinal unobstructed flow channels each extending through the support and defined by a thin wall, the inside layer is deposited on the wall of the flow passage, contains cerium oxide and platinum and has a weight of 10 to 200 g per liter of the catalyst, the outside layer is deposited on the inside layer, contains a zirconium compound and rhodium and has a weight of 5 to 60 g per liter of the catalyst, and the catalytically active refractory oxide is finely divided and has a specific surface area of at least about 10 $m^2/g$;

which comprises depositing a slurry containing a finely divided catalytically active refractory oxide and/or its precursor, cerium oxide or another cerium compound, and platinum or a platinum compound on a substantially catalytically inert refractory monolithic support, thereafter depositing a slurry containing a finely divided catalytically active refractory oxide and/or or its precursor, zirconium oxide or another zirconium compound and rhodium or a rhodium compound on the support, and calcining the support having the slurries so deposited thereon.

Figure 1:
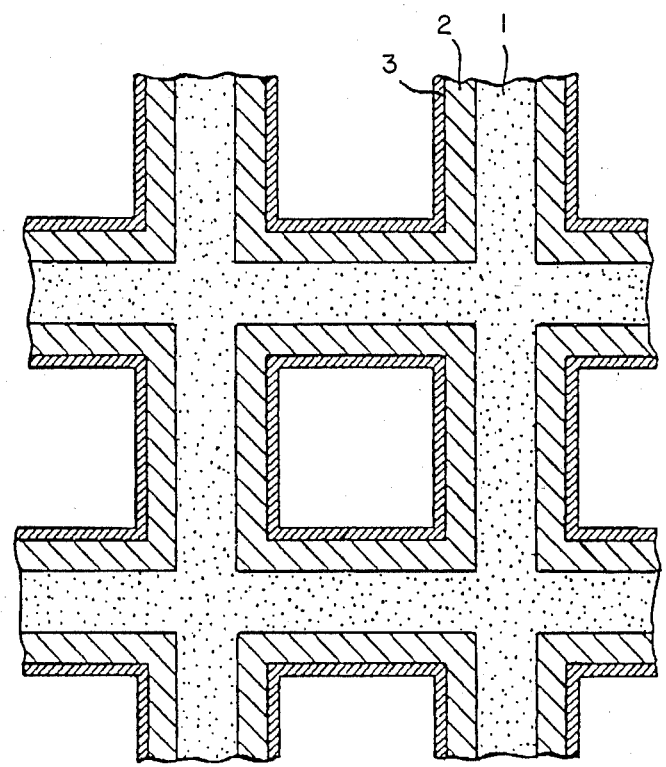
FIG. 1 is a catalyst model used in calculating the thickness of the inside layer (lower layer) and the outside layer (upper layer) of the catalyst in accordance with this invention. As shown in the figure, 1 is the monolithic support; 2 is the inside layer (lower layer); and 3 is the outside layer (upper layer).

The present invention will be described below in detail.

[A]First, the catalyst of the invention for purifying exhaust gases will be described.

The catalyst of the invention for purifying exhaust gases essentially comprises a substantially catalytically inert refractory monolithic support, an inside layer, i.e. a lower layer, formed on the support and containing a catalytically active refractory oxide, and an outside layer, i.e. an upper layer, formed on the inside layer and containing a catalytically active refractory oxide.

That the support is "substantially catalytically inert" means that at least a greater part of the catalytic activity of the catalyst of this invention depends upon the catalytic activities of the inside and outside layers, and does not have to depend upon the catalytic activity of the support. Of course, the support itself may be catalytically active.

The support may be made up of, for example, a refractory metal oxide, or a refractory metal. Examples of the refractory metal oxide include cordierite, mullite, alpha-alumina, sillimanite, magnesium silicate, zircon, petalite, spodumene and aluminosilicates. Examples of the refractory metal include refractory iron-base alloys such as stainless steel and Fecralloy, refractory nickel-base alloys, and refractory chromium-base alloys. A support composed of cordierite is one of the most desirable supports.

The support is of a monolithic structure and has continuous longitudinal unobstructed flow channels each extending through the support and defined by a thin wall surface. The thickness of the wall may be small to any extent so long as the support has strength required of the final catalyst.

A layer (inside layer) containing a catalytically active refractory oxide is deposited on the walls of the flow channels of the support. Examples of the catalytically active refractory oxide constituting the inside layer are active alumina, alpha-alumina, silica, silica-alumina and titania Active alumina, for example gamma-alumina, is preferred. Desirably, the active alumina has a specific surface area of 10 to 300 $m^2/g$. The weight of the catalytically active refractory oxide is usually 7 to 160 g, preferably 20 to 130 g, per liter of the catalyst. The catalytically active refractory oxide may occupy 50 to 95% by weight, preferably 60 to 85% by weight, of the inside layer.

The inside layer containing the catalytically active refractory oxide contains cerium oxide and platinum as essential ingredient. The weight of cerium oxide is 5 to 100 g, preferably 8 to 50 g, per liter of the catalyst. Cerium oxide occupies 5 to 50% by weight, preferably 15 to 40% by weight, of the inside layer. Desirably, cerium oxide has a specific surface layer of 10 to 300 $m^2/g$.

The weight of platinum may be any weight so long as the required catalyst activity can be obtained. Usually, it is 0.01 to 10 g, preferably 0.1 to 3 g, per liter of the catalyst.

The inside layer containing the catalytically active refractory oxide, cerium oxide and platinum has a weight of 10 to 200 g, preferably 20 to 180 g, more preferably 40 to 100 g, per liter of the catalyst.

If the inside layer does not contain cerium oxide, the catalyst has a greatly decreased rate of removal of carbon monoxide and hydrocarbons.

A layer (outside layer) containing the catalytically active refractory oxide is further deposited on the inside layer. The catalytically active refractory oxide constituting the outside layer may be the same as the catalytically active refractory oxide constituting the inside layer.

The weight of the catalytically active refractory oxide in the outside layer is 5 to 55 g, preferably 10 to 50 g, per liter of the catalyst. The catalytically active refractory oxide may occupy 50 to 95% by weight, preferably 70 to 90% by weight, of the outside layer.

The outside layer containing the catalytically active refractory oxide contains zirconium oxide and rhodium as essential ingredients. The weight of zirconium oxide is 1 to 20 g, preferably 2 to 15 g, per liter of the catalyst. Zirconium oxide occupies 5 to 50% by weight, preferably 10 to 30% by weight, of the outside layer.

The weight of rhodium may be any weight so long as the required catalytic activity is obtained. Usually, it is 0.002 to 2 g, preferably 0.02 to 0.7 g, per liter of the catalyst.

The weight of the outside layer containing the catalytically active refractory oxide, zirconium oxide and rhodium is 5 to 60 g, preferably 7 to 45 g, more preferably 7 to 40 g, per liter of the catalyst. If the weight of the outside layer exceeds 60 g, the resulting catalyst has a rapidly decreased ratio of removal of carbon monoxides, hydrocarbons and nitrogen oxides.

If the outside layer does not contain zirconium oxide, the catalyst has a reduced ratio of removal of carbon monoxide and hydrocarbons.

If the inside layer does not contain cerium oxide and the outside layer does not contain zirconium oxide, the catalyst has drastically decreased ratios of removal of carbon monoxide, hydrocarbons and nitrogen oxides. The decrease in the ratio of removal of hydrocarbons in this case is especially remarkable.

In the present specification, the thicknesses of the inside layer (lower layer) and the outside layer (upper layer) of the catalyst are calculated on the basis of the catalyst model shown in FIG. 1.

In the catalyst of this invention, the inside layer has a thickness of 5 to 110 microns, and the outside layer has a thickness of 3 to 35 microns.

[B] The process for producing the exhaust gas purifying catalyst of the invention will now be described.

Preparation of a slurry (slurry I) for the inside layer (lower layer):

A finely divided catalytically active refractory oxide is put in a mixer. It may be introduced together with its precursor.

The precursor of the catalytically active refractory oxide, as used in the present specification, denotes a substance which yields a catalytically active refractory oxide when calcined.

Active aluminas such as gamma-alumina may be used as the finely divided catalytically active refractory oxide. Examples of the precursor are alumina hydrates such as gibbsite, bayerite, nordstrandite and boehmite.

The finely divided catalytically active refractory oxide and its precursor may have a particle diameter of 1 to 100 microns, preferably 1 to 50 microns, especially preferably 1 to 30 microns.

A platinum compound such as hexahydroxoplatinic acid and chloroplatinic acid is added to the finely divided catalytically active refractory oxide. The platinum compound may be added little by little or at a time to the finely divided catalytically active refractory oxide while they are stirred by a mixer. The platinum oxide may be added as a solution such as an aqueous solution or a suspension such as an aqueous suspension. Preferably, the platinum compound may be added as an aqueous amine solution of hexahydroxoplatinic acid. The amount of the platinum compound added may be 1 to 100 g calculated as platinum, and 100 ml to 500 ml as the solution of the platinum compound, per kilogram of the finely divided catalytically active refractory oxide.

Then, a solution of acetic acid, preferably a 10-20% acetic acid solution, is added to the mixture containing the finely divided catalytically active refractory oxide and the platinum compound. Preferably, the acetic acid solution is added little by little while this mixture is stirred by a mixer. The amount of the acetic acid solution added may be 100 to 300 ml per kilogram of the catalytically active refractory oxide.

The resulting refractory oxide containing the platinum compound, cerium oxide, acetic acid and pure water are introduced into a mill and pulverized to form a slurry. The amount of cerium oxide is 50 to 500 g, preferably 150 to 400 g, per kilogram of the refractory oxide. The amount of acetic acid may be 40 to 100 ml per kilogram of the refractory oxide, and the amount of pure water may be 440 to 1100 ml per kilogram of the refractory oxide.

The average particle diameter of the refractory oxide and cerium oxide in the slurry is adjusted to 0.1 to 10 microns, preferably 1 to 5 microns, by the above pulverization in the mill.

The resulting slurry is transferred to a vessel, and pure water is added to form a slurry having a predetermined specific gravity which may, for example, be 1.20 to 1.75 g/ml.

The slurry I can be easily deposited not only on the refractory metal oxide support, but also on the refractory metal support, by adjusting its specific gravity.

Deposition of the slurry I on the support

The slurry I is deposited on the support described in section [A] above. It may, for example, be a monolithic cordierite carrier such as a cylindrical monolithic carrier (diameter 93 mm; length 147.5 mm; volume 1.0 liter; 300 cells/in$^2$). The slurry I is deposited on the support for a period of, for example, 1 to 60 seconds, preferably 3 to 10 seconds, and the excess of the slurry I in the cells is removed by a stream of air. Then, at least 50% of water, preferably at least 90% of water, is removed from the support having the slurry I deposited thereon by hot air, preferably hot air at 20° to 100° C. After water is removed, the support may be calcined in air at 200° to 900° C., preferably 300° to 800° C., for 10 minutes to 10 hours, preferably 15 to 60 minutes. When the temperature of the support is gradually raised in the calcination, the above drying (the removal of water) may be omitted.

By the above slurry deposition step, the platinum-carrying alumina and cerium oxide may be deposited, for example, in an amount of 5-160 g and 1-60 g, respectively on the support, for example the monolithic carrier.

Preparation of a slurry (slurry II) for the outside layer (upper layer):

A finely divided catalytically active refractory oxide is introduced into a mixer. This refractory oxide may be identical with, or different from, the refractory oxide used for preparation of slurry I. A precursor thereof may be introduced together into the mixer.

Active aluminas, such as gamma-alumina, may be used as the finely divided catalytically active refractory oxide. Examples of the precursor include alumina hydrates such as gibbsite, bayerite, nordstrandite and boehmite.

The finely divided catalytically active refractory oxide and its precursor may have a particle diameter of 1 to 100 microns, preferably 1 to 50 microns, especially preferably 1 to 30 microns.

A rhodium compound such as rhodium nitrate or rhodium chloride is added to the refractory oxide. The rhodium compound may be added little by little while the refractory oxide is stirred by a mixer. Alternatively, it is possible to add it all at a time, and then stir the mixture. The rhodium compound may be added as a solution, for example an aqueous solution, or a suspension, for example an aqueous suspension. Examples of preferred rhodium compounds are rhodium nitrate and rhodium chloride. The amount of the rhodium compound added may be 0.2 to 50 g calculated as rhodium, and 100 ml to 500 ml as the solution of the rhodium compound, per kilogram of the refractory oxide.

Subsequently, an acetic acid solution, preferably a 10–20% acetic acid solution, is added to the mixture of the refractory oxide and the rhodium compound. Preferably, the acetic acid solution is added little by little while the above mixture is stirred by a mixer. The amount of the acetic acid solution added may be 100 to 300 ml per kilogram of the finely divided catalytically active refractory oxide.

The resulting finely divided catalytically active refractory oxide containing the rhodium compound, a zirconium compound, acetic acid and pure water are introduced into a mill and pulverized to form a slurry. The zirconium compound used in this invention may, for example, be zirconyl acetate or zirconium hydroxide. The amount of the zirconium compound is 50 to 500 g, preferably 100 to 400 g, per kilogram of the refractory oxide calculated as zirconium oxide. The amount of acetic acid may be 40 to 100 ml per kilogram of the refractory oxide. The amount of pure water may be 440 to 1100 ml per kilogram of the refractory oxide.

The refractory oxide in the slurry obtained by the above pulverization has an average particle diameter of 0.1 to 10 microns, preferably 1 to 5 microns.

The resulting slurry is transferred to a vessel, and pure water is added to form a slurry II having a predetermined specific gravity which may, for example, be 1.05 to 1.40 g/ml.

Deposition of slurry II on the support having slurry I deposited thereon:

The slurry II is deposited on the support on which slurry I has already been deposited. The slurry II is deposited on this support for a period of, for example, 1 to 60 seconds, preferably 3 to 10 seconds, and the excess of the slurry II in the cells is removed by an air stream. The support having the slurry II deposited thereon is then dried with, for example, hot air, preferably hot air at 20° to 100° C., until at least 50% of water, preferably at least 90% of water, is removed. After drying in this manner, the support is calcined, for example in air, at a temperature of 200° to 900° C., preferably 300° to 800° C., for a period of 10 minutes to 10 hours, preferably 15 to 60 minutes. When the temperature of the support is relatively slowly elevated in the calcination, the above drying operation may be omittted.

The above slurry deposition step can lead to deposition of 5 to 100 g of the rhodium-carrying alumina and 1 to 50 g of zirconium oxide on the support (e.g., monolithic support).

The following examples illustrate the invention in more detail The invention, however, is not limited by these examples.

Production of catalysts

EXAMPLE 1

1.2 kg of gamma-alumina (average particle diameter about 20 microns) was put in a mixer. While the gamma-alumina was stirred by the mixer, 400 ml of an aqueous amine solution of hexahydroxoplatinic acid (containing 12.63 g of Pt) was added dropwise little by little and dispersed uniformly. Then, 200 ml of 15% by weight acetic acid was added dropwise little by little to gamma-alumina being stirred by the mixer, and uniformly dispersed. 727 g (calculated as the dry weight) of the platinum-containing alumina, 273 g of cerium oxide (average particle diameter about 15 microns), 50 ml of acetic acid and 550 ml of pure water were put in a porcelain pot, and milled for about 3 hours to form a slurry. The alumina and cerium oxide in the slurry had an average particle diameter of about 3.5 microns. The slurry was transferred to a 2-liter vessel, and pure water was added to adjust the specific gravity of the slurry to 1.56 g/ml. The slurry was deposited for 5 seconds on a cylindrical cordierite monolithic carrier (diameter 93 mm, length 147.5 mm, volume 1.0 liter, 300 cells/in$^2$). The excess of the slurry in the cells was removed by an air stream. Furthermore, about 90% of water was removed by using hot air at 30° to 60° C., and the carrier was calcined in an air stream at 500° C. for 30 minutes. By the above series of steps, 80 g of the platinum-carrying alumina (containing 0.83 g of Pt) and 30 g of cerium oxide were deposited on the monolithic carrier to form an inside layer (lower layer).

Then, 1.2 kg of gamma-alumina was put in a mixer, and while the gamma-alumina was stirred by the mixer, 400 ml of an aqueous solution of rhodium nitrate (containing 13.40 g of Rh) was added dropwise little by little and dispersed uniformly. Subsequently, 150 ml of 15% by weight acetic acid was added dropwise little by little to the gamma-alumina being stirred in the mixer, and uniformly dispersed. 500 g (calculated as the dry weight) of the rhodium-containing alumina, 30 ml of acetic acid and 580 g (117 g as zirconium oxide) of zirconyl acetate, and 350 ml of pure water were put in a porcelain pot, and milled for about 3 hours to form a slurry. The alumina in the slurry had an average particle diameter of about 3 microns. The slurry was transferred to a 2-liter vessel, and pure water was added to adjust its specific gravity to 1.17 g/ml.

The slurry was deposited on the monolithic carrier, followed by calcination, by performing the same steps as used in depositing the lower layer on the monolithic carrier. As a result, 15 g of rhodium-carrying alumina (containing 0.17 g of Rh) and 3.5 g of zirconium oxide were deposited as an outside layer (upper layer).

The above steps gave a catalyst (sample No. 1) having a lower layer (110 g/lliter of catalyst) of the platinum-carrying alumina/cerium oxide and an upper layer (18.5 g/liter of catalyst) of the rhodium-carrying alumina/zirconium oxide.

EXAMPLE 2

By the same method as in Example 1, a lower layer (110 g/liter of catalyst) of platinum-carrying alumina/cerium oxide was deposited on a monolithic carrier (1 liter). Then, rhodium-carrying alumina and a slurry were prepared by the same method as in Example 1 except that the amount of Rh in the aqueous solution of rhodium nitrate was decreased to 6.70 g. Subsequently, the specific gravity of the slurry was adjusted to 1.25 g/ml, and the process from deposition to calcination was carried out by the same method as in Example 1 to deposit 30 g of rhodium-carrying alumina (containing 0.17 g of Rh) and 7 g of zirconium oxide (total 37 g) were deposited on the monolithic carrier. The above steps gave a catalyst (sample No. 2) having a lower layer (110 g/liter of catalyst) of the platinum-carrying alumina/cerium oxide and an upper layer (37 g/liter of catalyst) of the rhodium-carying alumina/zirconium oxide.

COMPARATIVE EXAMPLE 1

By the same method as in Example 1, a lower layer (110 g/liter of catalyst) of platinum-carrying alumina/cerium oxide was deposited on a monolithic carrier (1 liter). Then, rhodium-carrying alumina was prepared by the same method as in Example 1 except that the amount of Rh in the aqueous rhodium nitrate solution was decreased to 3.35 g. Then, without adding pure water, a slurry was prepared by the same method as in Example 1. The specific gravity of the slurry was adjusted to 1.48 g/ml by adding pure water, and thereafter, the process from deposition to calcination was carried out by the same method as in Example 1 to deposit 60 g of the rhodium-carrying alumina (containing 0.17 g of Rh) and 14 g of zirconium oxide (total 74 g) on the monolithic carrier. The foregoing steps gave a catalyst (sample No. 3) having a lower layer (110 g/liter of catalyst) of the platinum-carrying alumina/cerium oxide and an upper layer (74 g/liter of catalyst) of the rhodium-carrying alumina/zirconium oxide.

COMPARATIVE EXAMPLE 2

By the same method as in Example 1, a lower layer (110 g/liter of catalyst) of platinum-carrying alumina/cerium oxide was deposited on a monolithic carrier (1 liter). Then, rhodium-carrying alumina was prepared by the same method as in Example 1 except that the amount of Rh in the aqueous rhodium nitrate solution was decreased to 2.23 g. Then, by the same method as in Comparative Example 1, a slurry was prepared. The specific gravity of the slurry was adjusted to 1.53 g/ml by adding pure water, and thereafter, the process from deposition to calcination was carried out by the same method as in Example 1 to deposit 90 g of the rhodium-carrying alumina (containing 0.17 g of Rh) and 21 g of zirconium oxide (total 111 g) on the monolithic carrier. The foregoing steps gave a catalyst (sample No. 4) having a lower layer (110 g/liter of catalyst) of platinum-carrying alumina/cerium oxide and an upper layer (111 g/liter of catalyst) of rhodium-carrying alumina/zirconium oxide.

EXAMPLE 3

Platinum-carrying alumina and a slurry were prepared by the same method as in Example 1 except that the amount of Pt in the aqueous amine solution of hexahydroxoplatinic acid was increased to 42.10 g. The specific gravity of the slurry was adjusted to 1.30 g/ml by adding pure water, and then the process from deposition of the slurry on a monolithic carrier (1 liter) to calcination was carried out by the same method as in Example 1 to deposit 24 g of the platinum-carrying alumina (containing 0.83 g of Pt) and 9 g of cerium oxide (total 33 g) on the monolithic carrier. Subsequently, by the same method as in Example 1, an upper layer (37 g/liter of catalyst) of rhodium-carrying alumina/zirconium oxide was deposited on the carrier. The foregoing steps gave a catalyst (sample No. 5) having a lower layer (33 g/liter of catalyst) of the platinum-carrying alumina/cerium oxide and an upper layer (37 g/liter of catalyst of the rhodium-carrying alumina/zirconium oxide.

EXAMPLE 4

Platinum-carrying alumina and a slurry were prepared by the same method as in Example 1 except that the amount of Pt in the aqueous amine solution of hexahydroxoplatinic acid was increased to 21.05 g. The specific gravity of the slurry was adjusted to 1.43 g/ml by adding pure water, and then by the same method as in Example 1, the process from deposition of the slurry on a monolithic carrier (1 liter) to calcination was carried out by the same method as in Example 1 to deposit 48 g of the platinum-carrying alumina (containing 0.83 g of Pt) and 18 g of cerium oxide (total 66 g) on the monolithic carrier. Subsequently, by the same method as in Example 1, an upper layer (37 g/liter of catalyst) of rhodium-carrying alumina/zirconium oxide was deposited on the carrier. The above steps gave a catalyst (sample No. 6) having a lower layer (66 g/liter of catalyst) of the platinum-carrying alumina/cerium oxide and an upper layer (37 g/liter of catalyst) of the rhodium-carrying alumina/zirconium oxide.

EXAMPLE 5

Platinum-carrying alumina was prepared by the same method as in Example 1 except that the amount of Pt in the aqueous amine solution of hexahydroxoplatinic acid was decreased to 9.72 g. A slurry was then prepared by the same method as used in Example 1 except that the amount of pure water was decreased to 450 ml. The specific gravity of the slurry was adjusted to 1.62 g/ml by adding pure water. Thereafter, the process from the deposition of the slurry on a monolithic carrier (1 liter) to calcination was carried out in the same way as in Example 1 to deposit 104 g of the platinum-carrying alumina (containing 0.83 g of Pt) and 39 g of cerium oxide (total 143 g) on the monolithic carrier. Subsequently, by the same method as in Example 1, an upper layer (37 g/liter of catalyst) of rhodium-carrying alumina/zirconium oxide was deposited on the carrier. The foregoing steps gave a catalyst (sample No. 7) having a lower layer (143 g/liter of catalyst) of the platinum-carrying alumina/cerium oxide and an upper layer (37 g/liter of catalyst) of the rhodium-carrying alumina/zirconium oxide.

EXAMPLE 6

Platinum-carrying alumina and a slurry were prepared by the same method as in Example 1 except taht the amount of Pt in the aqueous amine solution of hexahydroxoplatinic acid was decreased to 7.89 g. The specific gravity of the slurry was adjusted to 1.64 g/ml by adding pure water. Thereafter, the process from the deposition of the slurry on a monolithic carrier (1 liter) to calcination was carried out in the same way as in Example 1 to deposit 128 g of the platinum-carrying alumina (containing 0.83 g of Pt) and 48 g of cerium oxide (total 176 g) on the monolithic carrier. Subsequently, by the same method as in Example 1, an upper layer (37 g/liter of catalyst) of rhodium-carrying alumina/zirconium oxide was deposited on the carrier. The foregoing steps gave a catalyst (sample No. 8) having a lower layer (176 g/liter of catalyst) of the platinum-carrying alumina/cerium oxide and an upper layer (37 g/liter of catalyst) of the rhodium-carrying alumina/zirconium oxide.

COMPARATIVE EXAMPLE 3

A lower layer (110 g/liter of catalyst) of platinum-carrying alumina/cerium oxide was deposited on a monolithic carrier having the same size as in Example 1 by the same method as in Example 1. Then, rhodium-carying aluminum was prepared by the same method as in Example 1. The process from the preparation of a slurry (specific gravity 1.18 g/ml) to deposition and calcination was carried out by the same method as in Example 1 except that zirconyl acetate was not added, thereby to deposit 30 g of the rhodium-carrying alumina (containing 0.17 g of Rh) further on the monolithic carrier. The foregoing steps gave a catalyst (sample No.

9) having a lower layer (110 g/liter of catalyst) of the platinum-carrying alumina/cerium oxide and an upper layer (30 g/liter of catalyst) of the rhodium-carrying alumina.

COMPARATIVE EXAMPLE 4

Platinum-carrying alumina was preapared by the same method as in Example 1, and then without adding cerium oxide, a slurry was prepared by the same method as in Example 1. The specific gravity of the slurry was adjusted to 1.48 g/ml by adding pure water. By the same method as in Example 1, the process from deposition of the slurry on a monolithic carrier having the same size as in Example 1 to calcination was carried out to deposit 80 g of the platinum-carrying alumina (containing 0.83 g of Pt). Subsequently, by the same method as in Example 1, an upper layer (37 g/liter of catalyst) of rhodium-carrying alumina/zirconum oxide was deposited on the carrier. The foregoing steps gave a catalyst (sample No. 10) having a lower layer (80 g/liter of catalyst) of the platinum-carrying alumina and an upper layer (37 g/liter of catalyst) of the rhodium-carrying alumina/zirconium oxide.

COMPARATIVE EXAMPLE 5

By the same method as in Comparative Example 1, a lower layer of platinum-carrying alumina (80 g/ml of catalyst) was formed on a monolithic carrier having the same size as in Example 1. Then, by the same method as in Comparative Example 3, a layer (30 g/liter of catalyst) of rhodium-carrying alumina was deposited on it to form a catalyst (sample No. 11).

EXAMPLE 7

Example 1 was repeated except that a monolithic carrier having the same volume as in Example 1 (1 liter) but having 400 cells/in² was used. There was obtained a catalyst (sample No. 12) having a lower layer (110 g/liter of catalyst) of platinum-carrying alumina and cerium oxide and an upper layer (37 g/liter of carrier) of rhodium-carrying alumina/zirconium.

Test for the performance of the catalyst

Each of the catalysts (samples Nos. 1 to 12) obtained in Examples 1 to 7 and Comparative Examples 1 to 5 was calcined in a muffle furnace at 950° C. for 6 hours. A model gas composed of 1.0% of CO, 500 ppm of $C_3H_6$, 0.1% of NO, 0.33% of $H_2$, 0.845% of $O_2$, 14% of $CO_2$, 10% of $H_2O$ and the balance being $N_2$ gas was passed over the calcined catalyst at a space velocity of $5 \times 10^4$ hr$^{-1}$, and the conversions of substances to be controlled (CO, $C_3H_6$, NO) were examined. The temperature of the reaction gas was adjusted to 370° C. The results are shown in Table 1.

TABLE 1

Effect of the amounts (thicknesses) of the inside and outside layers of the two-layer catalyst upon the ratio of removal

| Example (Ex.) or Comparative Example (CEx.) | Sample No. | Amount of the lower layer deposited (g/liter) | | Amount of the upper layer deposited (g/liter) | | Number of cells per in² | Ratio of removal (%) | | | Thickness (microns) | |
|---|---|---|---|---|---|---|---|---|---|---|---|
| | | $Al_2O_3$ | $CeO_2$ | $Al_2O_3$ | $ZrO_2$ | | CO | $C_3H_6$ | NO | lower layer | upper layer |
| Ex. 1 | 1 | 80 | 30 | 15 | 3.5 | 300 | 91 | 81 | 92 | 59 | 11 |
| Ex. 2 | 2 | 80 | 30 | 30 | 7 | 300 | 85 | 74 | 86 | 59 | 22 |
| CEx. 1 | 3 | 80 | 30 | 60 | 14 | 300 | 67 | 44 | 64 | 59 | 43 |
| CEx. 2 | 4 | 80 | 30 | 90 | 21 | 300 | 61 | 28 | 53 | 59 | 65 |
| Ex. 3 | 5 | 24 | 9 | 30 | 7 | 300 | 91 | 85 | 93 | 18 | 22 |
| Ex. 4 | 6 | 48 | 18 | 30 | 7 | 300 | 86 | 79 | 82 | 35 | 22 |
| Ex. 5 | 7 | 104 | 39 | 30 | 7 | 300 | 88 | 63 | 79 | 76 | 22 |
| Ex. 6 | 8 | 128 | 48 | 30 | 7 | 300 | 90 | 69 | 83 | 94 | 22 |
| CEx. 3 | 9 | 80 | 30 | 30 | — | 300 | 77 | 41 | 78 | 59 | 17 |
| CEx. 4 | 10 | 80 | — | 30 | 7 | 300 | 25 | 8 | 63 | 46 | 22 |
| CEx. 5 | 11 | 80 | — | 30 | — | 300 | 22 | 4 | 55 | 46 | 17 |
| Ex. 7 | 12 | 80 | 30 | 30 | 7 | 400 | 96 | 92 | 96 | 48 | 18 |

In these samples, the Pt/Rh ratio is constant at 5/1, and the amount of each noble metal, at 1.0 g/liter of the catalyst.

It is seen from Table 1 that when the amount of the inside layer (the lower layer) is constant, the ratios of removal of CO, $C_3H_6$ and NO rapidly decrease if the amount of the outside layer (upper layer) exceeds about 60 g/liter (Examples 1 and 2, Comparative Examples 1 and 2).

It is seen on the other hand that when the amount of the outside layer (upper layer) is kept constant, variations in the amount of the inside layer (lower layer) do not substantially affect the ratios of removal of CO, $C_3H_6$ and NO (Examples 3 to 6).

The use of a monolithic carrier having 400 cells (Example 7) gives the same excellent effects of removing CO, $C_3H_6$ and NO as in the case of using a monolithic carrier having 300 cells (Examples 1 to 6).

The ratios of removal of CO, $C_3H_6$ and NO are drastically reduced when the inside layer (lower layer) does not contain cerium oxide [Comparative Example 3], the outside layer (upper layer) does not contain zirconium oxide [Comparative Example 4] and the inside layer (lower layer) does not contain cerium oxide and the outside layer (upper layer) does not contain zirconium oxide [Comparative Example 5].

We claim:

1. A catalyst for purifying exhaust gases essentially comprising a substantially catalytically inert, refractory monolithic support, an inside layer containing a catalytically active refractory oxide formed on the support, and an outside layer containing a catalytically active refractory oxide formed on the inside layer, characterized in that the support has continuous longitudinal unobstructed flow channels each extending through the support and defined by a thin wall, the inside layer is deposited on the walls of the channels, contains cerium oxide and platinum and has a weight of 10 to 200 g per liter of the catalyst, the outside layer is deposited on the inside layer, contains a zirconium compound and rhodium and has a weight of 5 to 60 g per liter of the catalyst, and the catalytically active refractory oxide is finely divided and has a specific surface area of at least about 10 m²/g.

2. The catalyst set forth in claim 1 wherein the inside layer has a thickness of 5 to 110 microns, and the outside layer has a thickness of 3 to 35 microns.

3. The catalyst set forth in claim 1 or 2 wherein the catalytically active refractory oxide is active alumina.

4. The catalyst set forth in any one of claims 1 to 3 wherein the support is composed of cordierite.

5. The catalyst set forth in any one of claims 1 to 3 wherein the support is composed of refractory metal.

6. The catalyst set forth in any one of claims 1 to 5 wherein the weight of cerium oxide is 15 to 40% by weight based on the weight of the inside layer.

7. The catalyst set forth in any one of claims 1 to 6 wherein the weight of platinum is 0.01 to 10 g per liter of the catalyst.

8. The catalyst set forth in any one of claims 1 to 7 wherein the zirconium compound is zirconium oxide.

9. The catalyst set forth in any one of claims 1 to 8 wherein the weight of the zirconium compound is 10 to 30% by weight based on the weight of the outside layer.

10. The catalyst set forth in any one of claims 1 to 9 wherein the weight of rhodium is 0.002 to 2 g per liter of the catalyst.

11. A process for producing a catalyst for purifying exhaust gases essentially comprising a substantially catalytically inert, refractory monolithic support, an inside layer containing a catalytically active refractory oxide formed on the support, and an outside layer containing a catalytically active refractory oxide formed on the inside layer, wherein the support has a continuous longitudinal unobstructed flow channels each extending through the support and defined by a thin wall, the inside layer is deposited on the walls of the channels, contains cerium oxide and platinum and has a weight of 10 to 200 g per liter of the catalyst, the outside layer is deposited on the inside layer, contains a zirconium compound and rhodium and has a weight of 5 to 60 g per liter of the catalyst, and the catalytically active refractory oxide is finely divided and has a specific surface area of at least about 10 m²/g;

which comprises depositing a slurry containing a finely divided catalytically active refractory oxide and/or its precursor, cerium oxide or another cerium compound, and platinum or a platinum compound on a substantially catalytically inert refractory monolithic support, thereafter depositing a slurry containing a finely divided catalytically active refractory oxide and/or or its precursor, zirconium oxide or another zirconium compound and rhodium or a rhodium compound on the support, and calcining the support having the slurries deposited thereon.

12. The process set forth in claim 11 wherein the inside layer has a thickness of 5 to 110 microns, and the outside layer has a thickness of 3 to 35 microns.

13. The process set forth in claim 11 or 12 wherein the catalytically active refractory oxide is active alumina.

14. The process set forth in any one of claims 11 to 13 wherein the support is composed of cordierite.

15. The process of any one of claims 11 to 13 wherein the support is composed of refractory metal.

16. The process set forth in any one of claims 11 to wherein the weight of cerium oxide is 15 to 40% by weight . based on the weight of the inside layer.

17. The process set forth in any one of claims 11 to 16 wherein the weight of platinum is 0.01 to 10 g per liter of the catalyst.

18. The process set forth in any one of claims 11 to 17 wherein the zirconium compound is zirconium oxide.

19. The process set forth in any one of claims 11 to 18 wherein the weight of the zirconium compound is 10 to 30% by weight based on the weight of the outside layer.

20. The process set forth in any one of claims 11 to 19 wherein the weight of rhodium is 0.002 to 2 g per liter of the catalyst.

21. The process set forth in any one of claims 11 to 20 wherein the platinum compound in the slurry is hexahydroxoplatinic acid.

22. The process set forth in any one of claims 11 to 21 wherein the rhodium compound in the slurry is rhodium nitrate.

23. The process set forth in any one of claims 11 to 22 wherein the zirconium compound in the slurry is zirconyl acetate.

* * * * *

UNITED STATES PATENT AND TRADEMARK OFFICE
CERTIFICATE OF CORRECTION

PATENT NO. : 4,806,519

DATED : Feb. 21, 1989

INVENTOR(S) : T. Chiba, et al

It is certified that error appears in the above—identified patent and that said Letters Patent is hereby corrected as shown below:

In the claims:

Claim 16, Column 14, Line 25, after "11 to " insert --15--.

Signed and Sealed this

Twelfth Day of December, 1989

Attest:

JEFFREY M. SAMUELS

*Attesting Officer*     *Acting Commissioner of Patents and Trademarks*